United States Patent
Laiho et al.

(10) Patent No.: US 9,798,792 B2
(45) Date of Patent: Oct. 24, 2017

(54) REPLICATION FOR ON-LINE HOT-STANDBY DATABASE

(71) Applicant: International Business Machines Corporation, Armonk, NY (US)

(72) Inventors: Kyosti M. Laiho, Espoo (FI); Jan P. Lindstrom, Ylamylly (FI); Jarmo Parkkinen, Malmgard (FI); Vilho T. Raatikka, Espoo (FI)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/655,364

(22) PCT Filed: Mar. 18, 2014

(86) PCT No.: PCT/EP2014/055431
§ 371 (c)(1),
(2) Date: Jun. 25, 2015

(87) PCT Pub. No.: WO2014/206581
PCT Pub. Date: Dec. 31, 2014

(65) Prior Publication Data
US 2015/0339366 A1 Nov. 26, 2015

(30) Foreign Application Priority Data
Jun. 25, 2013 (GB) .................................. 1311259.4

(51) Int. Cl.
*G06F 7/00* (2006.01)
*G06F 17/00* (2006.01)
*G06F 17/30* (2006.01)

(52) U.S. Cl.
CPC .. *G06F 17/30575* (2013.01); *G06F 17/30578* (2013.01)

(58) Field of Classification Search
CPC ..................... G06F 17/30575; G06F 17/30578
(Continued)

(56) References Cited

U.S. PATENT DOCUMENTS 5,170,480 A 12/1992 Mohan et al.
5,799,322 A * 8/1998 Mosher, Jr. ......... G06F 11/2074
(Continued)

FOREIGN PATENT DOCUMENTS

WO 2014206581 A1 12/2014

OTHER PUBLICATIONS

Das et al., "ElasTraS: An Elastic, Scalable, and Self-Managing Transactional Database for the Cloud", ACM Transactions on Database Systems, vol. 38, No. 1, Article 5, Publication date: Apr. 2013, © ACM, pp. 5:1-5:10, <http://dx.doi.org/10.1145/2445583.2445588>.

(Continued)

*Primary Examiner* — Kimberly Wilson
(74) *Attorney, Agent, or Firm* — Jay Wahlquist

(57) ABSTRACT

A method, and corresponding computer program product and computer system, for replicating a database image in a distributed database environment comprises: defining a checkpoint image of the primary node including a database structure and a plurality of database pages; creating a replica database by initiating a backup node and saving the defined structure on the initiated backup node; sending each database page of the checkpoint image for saving on the backup node; saving every transaction on the primary node and creating a corresponding REDO transaction; identifying each data page operated on by each REDO transaction; sending each created REDO transaction to the backup node in the order in which the corresponding transaction occurred, and prioritizing each identified database page so (Continued)

that it arrives at the backup node before or substantially at the same time as a corresponding REDO transaction.

20 Claims, 9 Drawing Sheets

(58) Field of Classification Search
USPC .......................................................... 707/610
See application file for complete search history.

(56) References Cited

U.S. PATENT DOCUMENTS

| | | | |
|---|---|---|---|
| 5,799,323 A * | 8/1998 | Mosher, Jr. | G06F 11/1458 |
| 5,884,328 A * | 3/1999 | Mosher, Jr. | G06F 11/1662 |
| 5,951,695 A | 9/1999 | Kolovson | |
| 6,263,338 B1 * | 7/2001 | Ronstrom | G06F 17/30368 |
| 6,732,123 B1 | 5/2004 | Moore et al. | |
| 7,039,663 B1 * | 5/2006 | Federwisch | G06F 11/1451 |
| 7,260,590 B1 | 8/2007 | Williams | |
| 7,305,421 B2 | 12/2007 | Cha et al. | |
| 7,587,429 B2 | 9/2009 | Liedes et al. | |
| 7,711,986 B2 | 5/2010 | Ozawa et al. | |
| 8,095,511 B2 | 1/2012 | Zwilling et al. | |
| 8,527,546 B2 | 9/2013 | Raatikka | |
| 8,543,613 B2 | 9/2013 | Raatikka | |
| 2003/0142955 A1 * | 7/2003 | Hashizume | G11B 27/031 386/265 |
| 2004/0098425 A1 | 5/2004 | Wiss et al. | |
| 2005/0262097 A1 * | 11/2005 | Sim-Tang | G06F 17/30085 |
| 2006/0136686 A1 | 6/2006 | Cherkauer et al. | |
| 2007/0220059 A1 * | 9/2007 | Lu | G06F 17/30368 |
| 2008/0155169 A1 * | 6/2008 | Hiltgen | G06F 9/5077 711/6 |
| 2009/0141962 A1 * | 6/2009 | Borgia | G06Q 20/04 382/139 |
| 2010/0114831 A1 | 5/2010 | Gilbert et al. | |
| 2010/0198920 A1 * | 8/2010 | Wong | G06F 9/544 709/206 |
| 2012/0042196 A1 * | 2/2012 | Aron | G06F 11/2028 714/4.11 |
| 2012/0054158 A1 * | 3/2012 | Hu | G06F 12/0866 707/692 |
| 2012/0109895 A1 | 5/2012 | Zwilling et al. | |
| 2012/0215752 A1 | 8/2012 | Parkkinen et al. | |
| 2012/0221528 A1 | 8/2012 | Renkes et al. | |
| 2013/0013602 A1 | 1/2013 | Manner et al. | |
| 2013/0013890 A1 | 1/2013 | Manner et al. | |
| 2013/0311446 A1 | 11/2013 | Clifford et al. | |
| 2015/0286649 A1 * | 10/2015 | Li | G06F 17/30377 707/624 |

OTHER PUBLICATIONS

Elmore et al., "Zephyr: live migration in shared nothing databases for elastic cloud platforms", SIGMOD '11 Proceedings of the 2011 ACM SIGMOD International Conference on Management of data, pp. 301-312, ACM, New York, NY, USA © 2011, ISBN: 978-1-4503-0661-4, <http://dl.acm.org/citation.cfm?id=1989356&dl=ACM&coll=DL&CFID=497579506&CFTOKEN=54393931>.

Gray et al., "Transaction Processing: Concepts and Techniques", 1992 Book, Morgan Kaufmann Publishers Inc., San Francisco, CA, USA © 1992, ISBN: 1558601902, <http://dl.acm.org/citation.cfm?id=573304>.

IBM, "5.2.3 solidDB HSB replication and transaction logging", Redbooks, pp. 1-7, Copyright IBM Corp. 2011, http://www.redbooks.ibm.com/redbooks/SG247887/5-2-3.htm>.

Manassiev et al., "Scaling and Continuous Availability in Database Server Clusters through Multiversion Replication", 37th Annual IEEE/IFIP International Conference on Dependable Systems and Networks (DSN'07), pp. 1-11, © 2007 IEEE.

Xiongpai et al., "A Parallel Recovery Scheme for Update Intensive Main Memory Database Systems", 2008 Ninth International Conference on Parallel and Distributed Computing, Applications and Technologies, pp. 509-516, © 2008 IEEE.

Xiongpai et al., "Simulation of Main Memory Database Parallel Recovery", pp. 1-8, Key Laboratory of Data Engineering and Knowledge Engineering (School of Information, Renmin University of China), Copyright held by SCS, noted in correspondence dated Mar. 24, 2015.

"Replication for On-Line Hot-Standby Database", UK Patent Application No. 1311259.4, filed on Jun. 25, 2013, pp. 1-34.

"Patents Act 1977: Search Report under Section 17(5)", Intellectual Property Office, Application No. GB1311259.4, dated Dec. 5, 2013, pp. 1-3.

"Patent Cooperation Treaty", PCT Notification of Transmittal of the International Search Report and the Written Opinion of the International Searching Authority, or the Declaration, International application No. PCT/EP2014/055431, International filed Mar. 18, 2014, pp. 1-14.

* cited by examiner

REPLICATION FOR ON-LINE HOT-STANDBY DATABASE

BACKGROUND OF THE INVENTION

This invention relates to a method and apparatus for a replicator for an on-line hot-standby database.

In a hot-standby (HSB) database, a transaction is committed in two phases whereby both a primary node and a backup node must acknowledge changes successfully before the transaction is considered as properly committed. This is a two-phase commit (2PC) protocol that ensures a database in both nodes has always the same state. 2PC is an atomic commitment protocol (ACP) and a specialized type of consensus protocol for coordinating all the processes that participate in a distributed atomic transaction on whether to commit or abort (roll back) a transaction. Some HSB databases provide an option for the user to trade consistency for performance by providing more relaxed transactions. Such a transaction is defined in a two-safe received (2SR) protocol in which primary node commits as soon as a backup node acknowledges that it has received all log records of the committing transaction.

A primary node is sometimes known as a master node, and a backup node is sometimes known as a secondary node, standby node or slave node. Typically, a primary node accepts all transactions, while a backup node only accepts read-only transactions.

SUMMARY

In a first aspect of the invention there is provided a replicator for replicating a database image from an operational primary node in a distributed database environment, said replicator comprising: an image engine for defining a checkpoint image of the primary node including a database structure and a plurality of database pages; a controller for creating a replica database on a backup node by initiating a backup node and saving the defined database structure on the initiated backup node; a transmission mechanism for sending each database page of the checkpoint image to the backup node for saving; a logger for saving, after creation of a checkpoint image is started, every subsequent transaction on the primary node thereby creating a corresponding REDO transaction for sending to the backup node; a page identifier for identifying each data page operated on by each subsequent transaction; a parallel transmission mechanism for sending, in parallel with the sending of the database pages, each created REDO transaction to the backup node in the order in which the corresponding transaction occurred so that the backup node can replicate the transactions in the correct order; and a page controller for prioritizing each identified database page so that it arrives at the backup node before or substantially at the same time as a corresponding REDO transaction whereby the corresponding REDO transaction can operate on the identified database page without waiting for the remaining database page to be saved on the backup node.

According to a second aspect of the invention there is provided a method for replicating a database image from an operational primary node to a backup node in a distributed database environment, said method comprising: defining a checkpoint image of the primary node including a database structure and a plurality of database pages; initiating creation of a replica database on a backup node by initiating a backup node and saving the defined database structure on the initiated backup node; sending each database page of the checkpoint image to the backup node for saving; saving, after creation of a checkpoint image is started, every transaction on the primary node and creating a corresponding REDO transaction for sending to the backup node; identifying each data page operated on by each REDO transaction; sending, in parallel with the sending of the database pages, each created REDO transaction to the backup node in the order in which the corresponding transaction occurred so that the backup node can replicate the transactions in the correct order; and prioritizing each identified database page so that it arrives at the backup node before or substantially at the same time as a corresponding REDO transaction whereby the corresponding REDO transaction operate on the identified database page without waiting for every database page to be saved on the backup node.

It is proposed that the database structure is defined and extracted from the primary node and sent to a newly created backup node in parallel with sending the REDO transaction to operate on the backup node. The newly created backup node replicates the database structure once it arrives. Replicating (also known as synchronizing) includes creating empty database structure (metadata, tables and indexes). Immediately after metadata structural replication, the backup node can start to establish connections with database clients and start to serve them. The remaining data pages are sent in parallel with execution of REDO transactions. Interleaving database pages and REDO transactions is advantageous because the backup node receives the data that is most needed first.

Major benefits are that primary nodes can execute transactions without interruptions; furthermore, primary nodes can start sending REDO transactions to the backup node once the backup node has received and processed the metadata. In addition to that, the embodiments make it possible to send data pages to the backup node from main memory in parallel with sending of REDO transactions.

The embodiments recognize the possibility of replicating REDO transactions from a primary node to a backup node at the same time when a seed database is copied from primary node to a backup node. In other words, an HSB synchronization process traditionally includes transferring a fresh checkpoint image from storage of a primary node to a backup node, followed by a catch-up phase. Only after the catch-up phase is it possible to start log transactions from a primary node to a backup node.

The embodiments make it possible to copy a checkpoint image directly from a primary node main memory to a backup node without input/output access to slow persistent disk storage. The embodiments also make it possible to start replicating active REDO transactions from a primary node to a backup node during an HSB synchronization process. As a consequence, the checkpoint image transfer is faster because there are no persistent storage operations. Furthermore, memory consumption in a primary node is much smaller than in case when all active transactions must be buffered in primary node for whole checkpoint image transfer (that is, every data page).

As a consequence, the duration of database synchronization process is not bound by disk or system performance but by the network transfer capacity. Since network transfer capacity can be increased, for example by using proprietary network protocols instead of TCP/IP, then the storage input/output bottleneck is removed thereby shortening the HSB synchronization process and increasing the overall availability of an HSB database.

The depicted embodiment is described in terms of two-safe received (2SR) protocol transactions, however other embodiments could use other types of transactions including one-safe received (1SR) protocol transactions, in which transactions commit as soon as a commit request has been sent to backup node from a primary node commit.

Advantageously, a modified database page is prioritized over an unmodified database page. It is advantageous to send the most popular data (that is modified pages or dirty pages) as soon as possible so that less frequently needed pages do not compete for shared resources.

More advantageously, a database page in main memory is prioritized over database pages in persistent storage. Main memory is prioritized because data is accessed faster and transfer times are shorter than for persistent storage. Main memory is typically volatile memory with lower capacity but faster access times. Persistent storage is typically persistent disk drive with higher capacity but lower access times.

Still more advantageously, the method further comprises: identifying two or more data page operated on by a REDO transaction; and sending said two or more data pages in parallel with the sending of the created REDO transaction.

Yet more advantageously, the primary node notifies the backup node that all database pages have been sent.

Preferably, the backup node notifies the primary node that all database pages have been received.

More preferably, REDO transactions and database pages are interleaved in a send buffer before sending to a backup node.

Still more preferably, transactions place a continuous load on primary node.

The embodiments have an effect on transaction processes carried on outside the cluster database environment such that performance of the database during a node failure will appear to the transaction processes as not substantially in decline but substantially consistent. Such an effect operates at a machine and system level of an executing computer and below any overlying application level. The embodiments demonstrate an increase in the speed of the computer during a node failure.

In a third aspect of the invention there is provided a computer program product for replicating an operational primary database in a cluster database environment, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing all the steps of the method claims.

In a fifth aspect of the invention there is provided a data carrier aspect of the depicted embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Depicted embodiments of the present invention will now be described, by way of example only, with reference to the following drawings in which.

DETAILED DESCRIPTION

Figure 1:
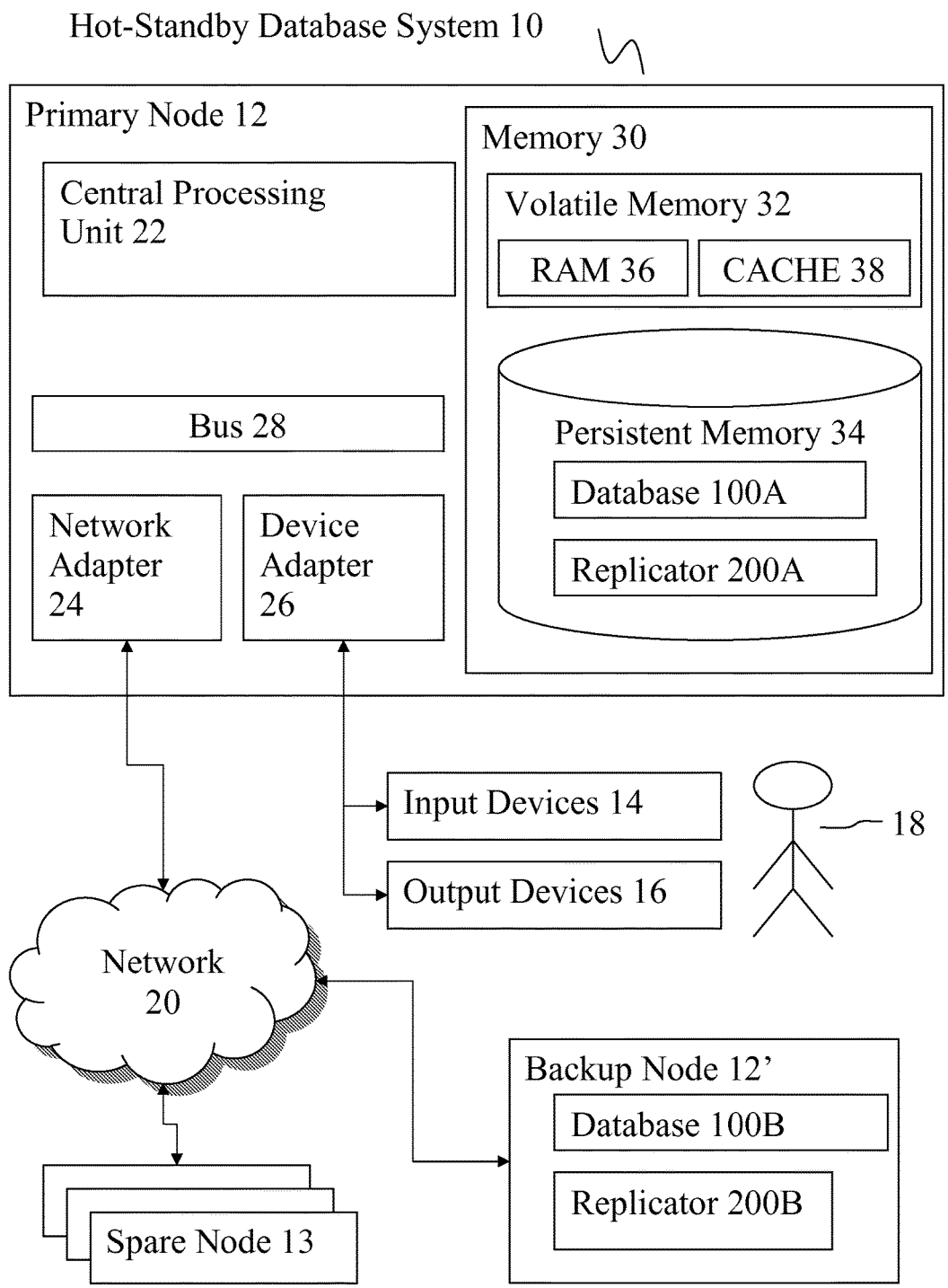
FIG. 1 is a deployment diagram of the depicted embodiment.

There are different ways to keep a backup node in synchronization with a primary node but in this publication, log replication (also known as log shipping replication) is considered. In log replication, a primary node stores each write transaction to its database and to a log record whereby the log records are further copied to a backup node. When a backup node receives log records it executes a REDO transaction for each log record received. A REDO transaction repeats the referenced transaction. In the embodiments, an HSB database is stored in main memory for fast data access because main memory is directly addressed by a computer processing unit (CPU) as opposed to indirect access and slower access speed from persistent storage. Fast memory access is not a property of HSB databases in particular but it applies to in-memory databases, which may support hot-standby functionality. Log records are typically stored in persistent storage. An in-memory database guarantees persistent modifications to data by periodically (or on-demand) writing checkpoint images (also known as snapshots) of the database to persistent storage. Checkpoint image writing is a checkpoint process. In a checkpoint image, data is organized as database pages, which are continuous data areas in storage, and typically equal in size with single or multiple storage logical blocks. For simplicity, it is assumed that a database page is equal in size with a disk block.

An in-memory database maintains its active data in volatile memory. It is typical that an in-memory database includes a built-in manager for the memory, which allocates large portions of memory from the operating system, and then organizes it in the most suitable way for the use of an in-memory database. It is assumed that the data is stored in differently sized memory segments, but each memory segment includes information that makes it possible to organize the data in memory page sizes for checkpoint image creation. Alternatively, the database could be organized in memory page-sizes in memory.

In an HSB database there is one primary node and typically one backup node, however, some variants having multiple backup nodes. In more complex systems it is possible to have a database duplicated on partitions (or 'shards') whereby one partition is considered a master and other partitions are considered as backups. The embodiments apply to this partitioned model as well. A node may mean a physical separate computer unit, a card in a rack, or a process in a virtual machine within the single host computer. From time to time, an HSB database or a computer node running an HSB database will crash. Such a crash will violate the checkpoint image of one of the nodes in such a way that the database stored on the violated node can no longer be recovered. If another node stays operational during a crash then it may be switched to primary (if it was not the primary already) and it will continue executing transactions.

Sometime after a primary node failure, another node is initiated as a backup node. The initiated node may be the failed (and recovered) node or a spare node that is capable of acting as a backup node in HSB database. If the primary node has failed, there is no way to initiate a backup node from a non-existing checkpoint image. A database copy is possible only when the primary node is up and running. If the initiated backup node does not have the database stored on its disk, then it cannot restore and it is not capable of processing transactions stored in REDO transactions. Therefore, a copy of the data needs to be provided for the initiated backup node, followed by log records containing all modifications made in the database on the primary node after the moment the checkpoint image was created.

If a backup node has been restarted after failure, then it may have a corrupted checkpoint image or no checkpoint image at all. Therefore, a full checkpoint image needs to be copied from primary node to backup node without taking the primary node offline. The backup node needs: metadata; system tables; the most recent checkpoint image; and REDO transactions of write transactions that have been executed from a point when checkpoint image creation was initiated to a point when both primary and backup databases are consistent.

Synchronizing a database on a backup node with data from a primary node comprises two phases: a copying phase and a catch-up phase. The copying phase comprises copying the database on the primary node to the backup node. The catch-up phase comprises performing, on the backup node, log records about transactions that have already been executed and committed in primary node. When one of the nodes is failed or recovering then the system is in a vulnerable phase because the failure tolerance of HSB database has decreased due to the failure.

Known HSB synchronization solutions perform full copies of one or more checkpoint images including iterative versions of the checkpoint images followed by the log records created by the most recent transactions.

For instance, a known HSB synchronization process can be divided into a primary synchronization process in the primary node: sending a checkpoint image (including metadata and actual data) from the primary node to the backup node; sending REDO transactions that were active during the creation of checkpoint image; and sending REDO transactions that were executed in primary node during synchronization. The corresponding backup synchronization process can be divided into the corresponding steps: receiving a checkpoint image (including metadata and actual data); receiving REDO transactions that were active during the creation of the checkpoint image; and receiving REDO transactions that were executed in a primary node during synchronization.

An in-memory database running on commodity hardware can execute hundreds of thousands of separate write transactions every second. Under normal circumstances, read-only transactions can be executed both in a primary node, and in a backup node thereby distributing the load partially away from the primary node. When other nodes fail, the remaining node may have to switch its role to primary (if it was not primary already). The primary node immediately becomes responsible for all write and read-only transactions, which in practice may double the number of its active client connections. As a consequence, the memory consumption of the primary node increases remarkably, and depending on the type of load and implementation details, the performance may decrease due to increased number of concurrently executed transactions.

When the backup node starts recovering, the primary node is responsible for creating a fresh checkpoint image of the current state of the database, which will be copied to backup to a database seed. All transactions that were not committed during checkpoint image creation will have to be recorded as REDO transactions in the primary node, sent to a backup node and executed. This is the catch up phase.

Copying a checkpoint image from a primary node to a backup node, and having backup node catch up with primary node must be done before primary node memory runs out. If the primary node memory runs out then the HSB synchronization process will fail or alternatively, the primary node's REDO transactions must be stored to storage to decrease memory consumption. Persistent storage REDO transactions need to be read from persistent storage disk and this is much slower than reading data from fast memory.

Accessing REDO transactions from persistent storage slows down the catch-up phase. Slow catch-up increases the risk of consequent failures, and a backup node's overall ability to catch-up with primary node in time. Additional failures during vulnerability time may be fatal from the point of the HSB database. If a backup node cannot catch up with a primary node after first failure then the risk of fatal error is increased in the future.

Therefore, catch-up phase becomes a serious threat for the availability of HSB databases in cases where update frequency is high, and it is important to make the HSB synchronization process as fast as possible to minimize that risk.

Referring to FIG. 1, the deployment of a depicted embodiment in hot-standby database system 10 is described. Hot-standby database system 10 is operational with numerous other general purpose or special purpose computing system environments or configurations. Examples of well-known computing processing systems, environments, and/or configurations that may be suitable for use with hot-standby database system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Hot-standby database system 10 may be described in the general context of computer system-executable instructions, such as program modules, being executed by a computer processor. Generally, program modules may include routines, programs, objects, components, logic, and data structures that perform particular tasks or implement particular abstract data types. Hot-standby database system 10 may be embodied in distributed cloud computing environments where tasks are performed by remote processing devices that are linked through a communications network. In a distributed cloud computing environment, program modules may be located in both local and remote computer system storage media including memory storage devices.

Hot-standby database system 10 comprises: general-purpose computer server primary node 12; one or more input devices 14 and output devices 16 directly attached to primary node 12; a computer server backup node 12' and at least one spare node 13.

Hot-standby database system 10 is connected to a network 20. Hot-standby database system 10 communicates with a user 18 using input devices 14 and output devices 16. Input devices 14 include one or more of: a keyboard, a scanner, a mouse, trackball or another pointing device. Output devices 16 include one or more of a display or a printer. Hot-standby database system 10 communicates with network devices (not shown) over network 20. Network 20 can be a local area network (LAN), a wide area network (WAN), or the Internet.

Computer server primary node 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in register (not shown); transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is the lowest language level of abstraction possible on the system. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the primary node 12 and network devices including backup nodes.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Hot-standby database system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the depicted embodiment comprises database 100A and replicator 200A. Backup node 12' comprises database 100B and replicator 200B. Further program modules that support the depicted embodiment but are not shown including firmware, boot strap program, operating system, and support applications. Each of the operating system, support applications, other program modules, and program data or some combination thereof, may include an implementation of a networking environment.

Hot-standby database system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with hot-standby database system 10. Examples, include, but are not limited to: microcode, device drivers, redundant processing units, external disk drive arrays, redundant array of independent disks (RAID), tape drives, and data archival storage systems.

Figure 2:
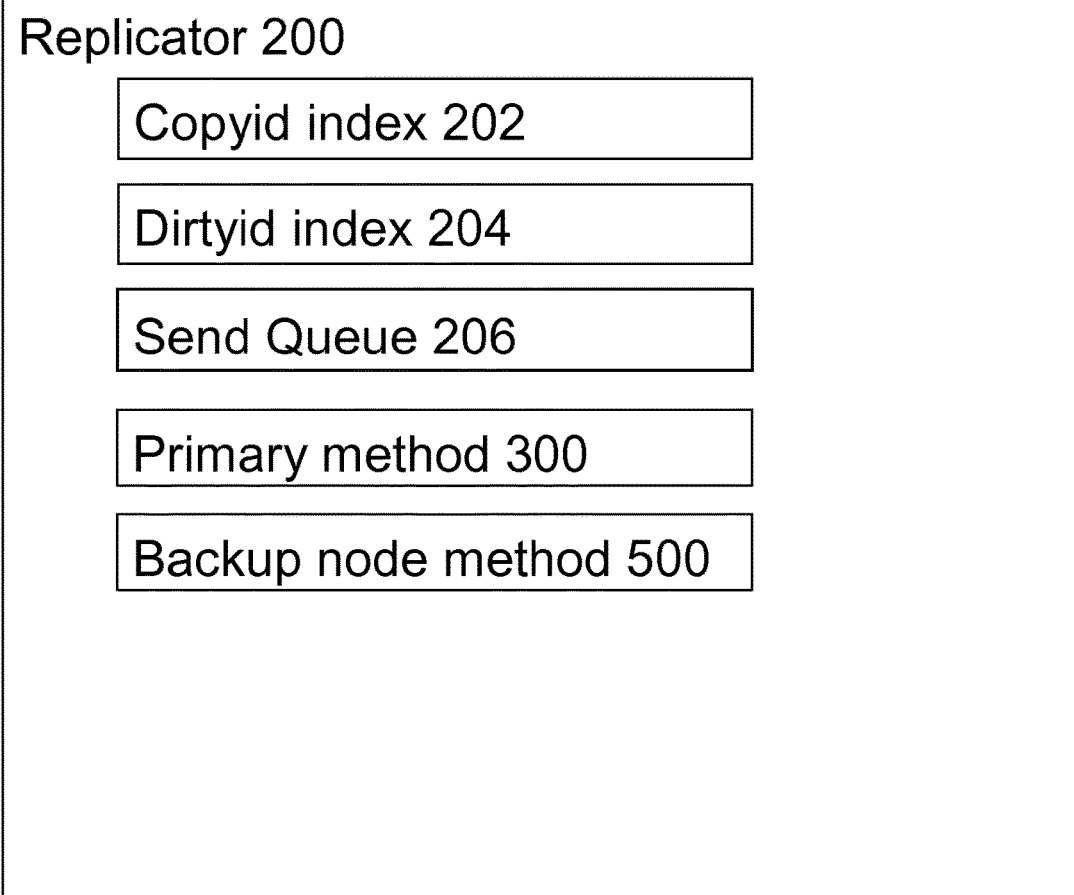
FIG. 2 is a component diagram of the depicted embodiment.

Referring to FIG. 2, replicator 200 (a general class of replicators 200A and 200B) comprises the following components: copyid index 202; dirtyid index 204; send queue 206; primary method 300 and backup node method 500.

Copyid index 202 is a data structure for storing references for database pages that have already been sent to a backup node for a particular checkpoint image.

Dirtyid index 204 is a data structure for storing references for database pages that have been changed since the checkpoint image was defined. Alternatively, if all the database pages for a checkpoint image are to be read from memory instead of reading unmodified database pages from disk, then dirtyid index 204 includes identifiers of all database pages. In the former case, whenever an unmodified database page is modified then its identifier is added to dirtyid index 204. Dirtyid index 204 is emptied when checkpoint image creation is complete. In the latter case, dirtyid index 204 includes all database page identifiers of the database.

Send queue 206 is a queue for storing database pages and REDO transactions prior to sending to a backup node.

Primary method 300 is for replicating a primary node and is described below in detail with reference to FIG. 3 and FIG. 4A to 4D.

Backup node method 500 is a corresponding backup node process for replicating the primary node and is described in detail below with reference to FIG. 5.

Figure 3:
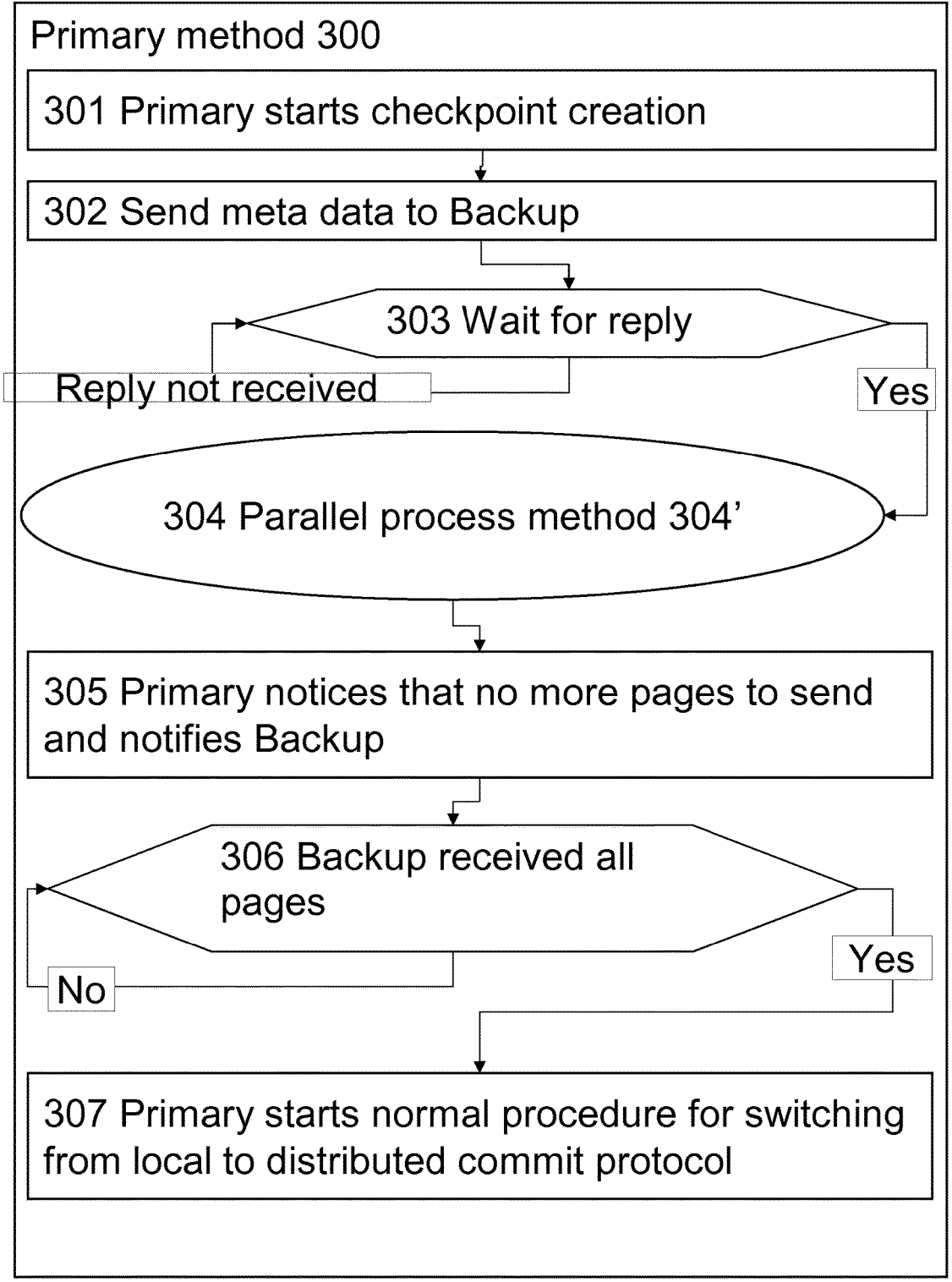
FIG. 3 is a flow diagram of a process of the depicted embodiment.

Referring to FIG. 3, primary method 300 comprises logical process steps 301 to 307.

In a starting situation, primary method 300 executes transactions when another node, destined to become a new backup node, is started. A new backup node does not have a database image of its own either because it has corrupted or it is totally missing. It needs to share a common database with primary node. Primary method 300 creates a self-contained consistent version of its database called a checkpoint image or snapshot. In an in-memory database the checkpoint is created in memory from where it is copied for transfer to a backup node. Pages can be read in parallel from disk and from main memory. Dirty pages are in main memory because they were modified recently. Thus it is more likely that they will be modified again sooner than the pages on disk.

A database page found in copyid index 202 of a primary node has one of the following states: BUFFERED (when it is already added to send buffer so it has already been found and decided to be sent to a backup node); and SENT (when actual sending of a page has occurred).

Step 301 is for creating a new checkpoint image and a new checkpoint identifier. A checkpoint counter is incremented. Updates caused by transactions do not lose data during checkpoint image creation. Update transactions can perform commits during checkpoint image creation. Prior checkpoint image versions are maintained until they are stored in persistent storage.

Step 302 is for extracting necessary database structure, including metadata and system tables, from the database and sending them to backup node 12'.

Step 303 is for waiting for a reply. Acknowledgement arrives from the backup node 12' informing that metadata is successfully processed and backup node 12' is ready to receive data and REDO transactions.

Step 304 is for parallel processing of REDO transactions and database pages and is described in more detail below with reference to parallel process method 304' of FIG. 4A to 4D.

Step 305 is for detecting when all database pages have been sent to the backup node and for notifying the backup node that no more pages will be sent.

Step 306 is for acknowledging that all database pages have been received from the backup node and restored.

Step 307 is for reverting back to normal procedure and for switching from a local to distributed commit protocol.

Figure 4A:
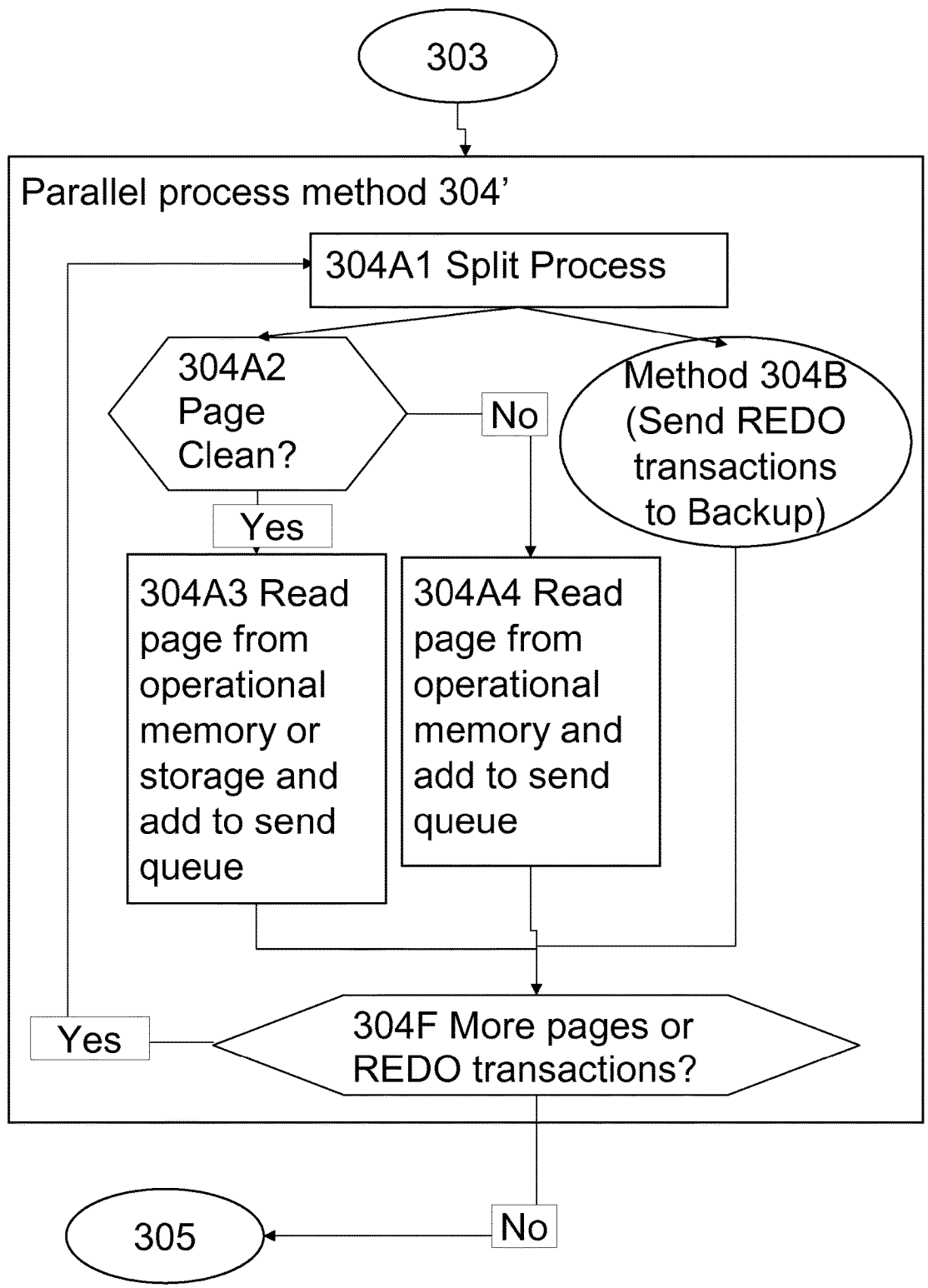
FIG. 4A to 4D are flow diagrams of sub-processes of the depicted embodiment.

Referring to FIG. 4A, parallel process method 304' comprises logical process steps 304A1, 304A2, 304A3, 304A4, 304F and method 304B.

Step 304A1 is for splitting the process into two separate processes that run in parallel: a first process for sending database pages to the backup node starting at step 304A2 and a second process for handling REDO transactions at method 304B.

Step 304A2 is for determining if a database page is clean or dirty (unmodified or modified) since the checkpoint image creation. Dirtyid index 204 is consulted. If the database page is not listed in dirtyid index 204 then the page is clean and onto step 304A3. Else the page is dirty and on to step 304A4. The database page is dirty if it is listed in dirtyid index 204 because it has been modified.

Step 304A3 is for reading the database page from main memory or from storage. In terms of consistency it does not matter as both pages will correspond. However, in the depicted embodiment the database page is read from the operational memory because access times will be faster. The accessed database page is sent to send queue 206 for transfer to the backup node. Next step 304F

Step 304A4 is for reading the database pages from main memory only because that is where the most up-to-date copy of the page resides. Next step 304F.

Method 304B is for sending REDO transactions to the backup node and is described below in more detail with respect to FIG. 4B. Next step 304F.

Step 304F is for determining if there are any more database pages or REDO transactions to process and returning to step 304A1 if so. Else on to step 305.

Figure 4B:
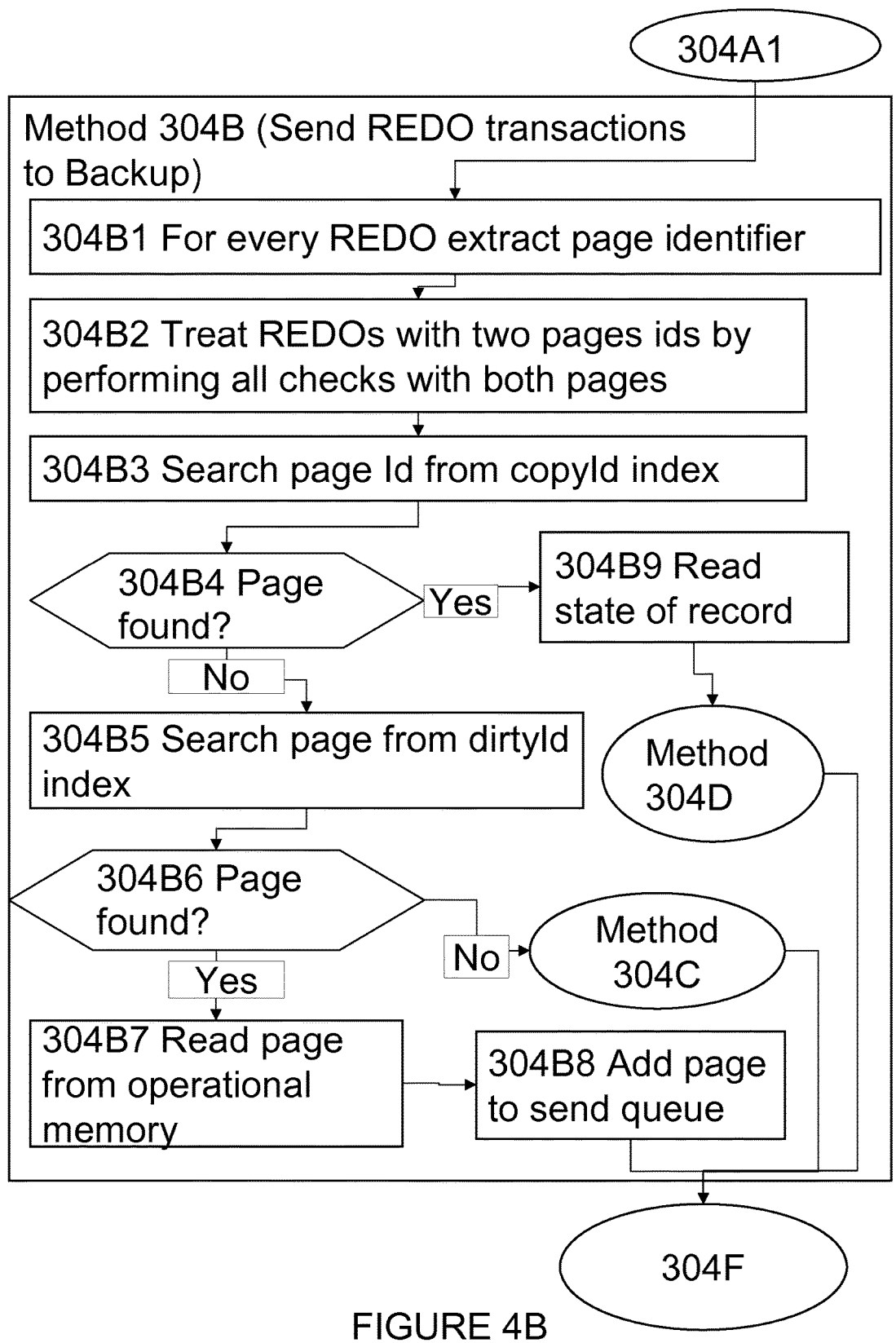

Referring to FIG. 4B, method 304B (send REDO transactions to backup node) comprises logical process steps 304B1 to 304B9, method 304C and method 304D.

Step 304B1 is for defining a loop for every REDO transaction and for extracting a database page identifier from a respective REDO transaction.

Step 304B2 is for treating a REDO transaction with two or more database pages by performing all checks on all pages.

Step 304B3 is for searching copyid index 202 for extracted page identifiers or page identifiers to determine if the database page has already been sent to the backup node.

Step 304B4 is for branching to step 304B5 if the extracted page id is not in copyid index 202 and therefore not already sent to the backup node. Else if the extracted page id is in copyid index 202 then step 304B9.

Step 304B5 is for searching the extracted page ID in dirtyid index 204 to see if it has been modified after the checkpoint.

Step 304B6 is for branching to step 304B7 if dirtyid index 204 contains the extracted page ID. Else the process branches to method 304C.

Method 304C is for handling page IDs that are not found in copyid index 202 or in the dirtyid index 204 and proceeding to step 304F when finished. Method 304C is described in more detail below with reference to FIG. 4C.

Step 304B7 is for reading the page from main memory.

Step 304B8 is for adding the read page to send queue 206 for sending to the backup node.

304F is described previously as looping back to step 304A1 if there are more pages or REDO transactions.

Step 304B9 is for reading the state of the record and proceeding to method 304D.

Method 304D is for handling database page IDs that are found in the copyid index 202 and proceeding to step 304F when finished. Method 304D is described in more detail below with reference to FIG. 4D.

Figure 4C:
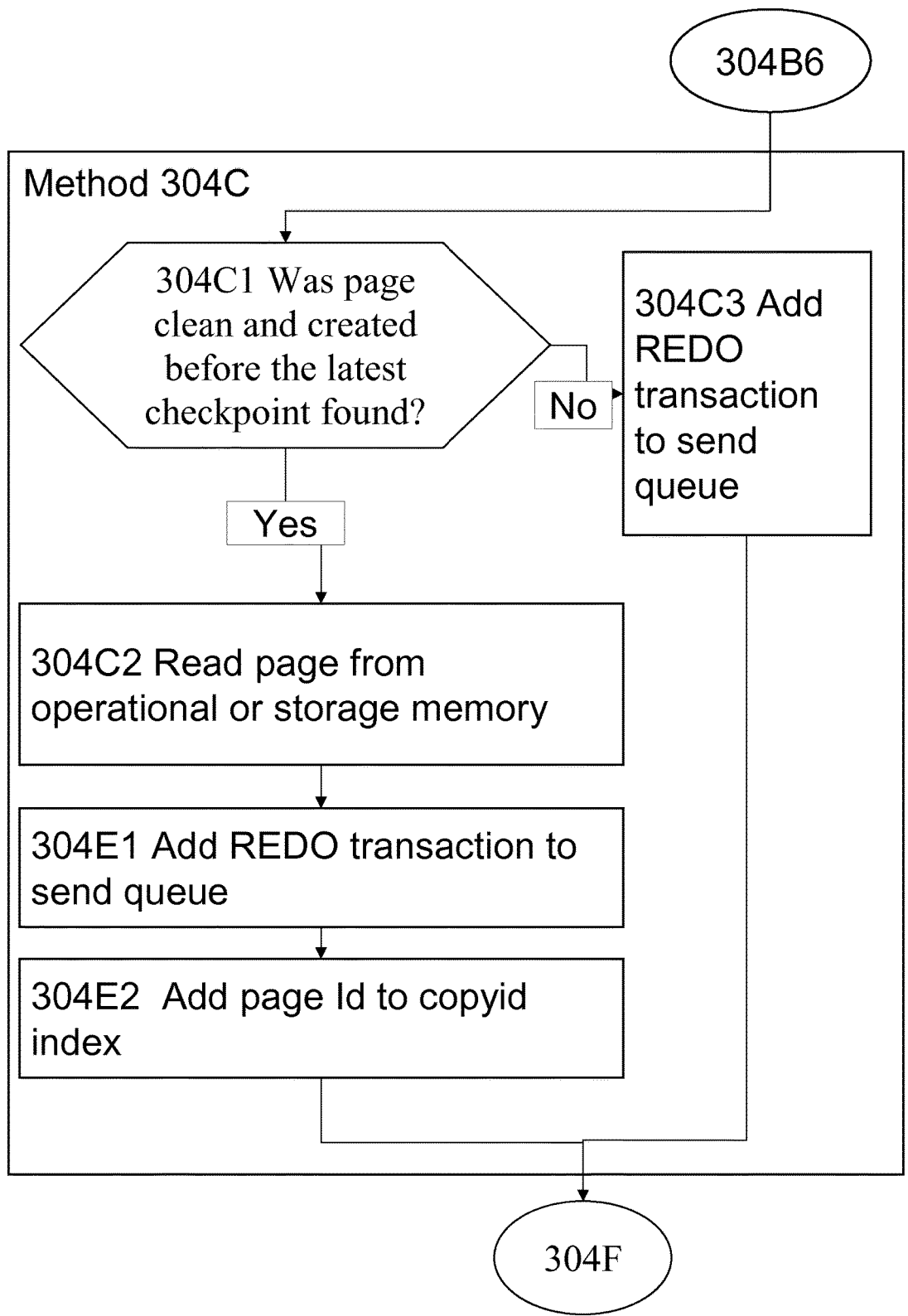

Referring to FIG. 4C, method 304C comprises logical process steps 304C1 to 304C3, 304E1 and 304E2.

Step 304C1 is for branching to step 304C2 if the extracted database page is clean and created before the latest checkpoint image. Else step 304C3.

Step 304C2 is for reading a database page from operational memory or storage memory. Next step 304E1.

Step 304E1 is for adding a REDO transaction to send queue 206. Next step 304E2.

Step 304E2 is for adding the database page identifier to copyid index 202 and then proceeding to step 304F.

Step 304C3 is for adding only the REDO transaction to send queue 206 before proceeding to step 304F.

Figure 4D:
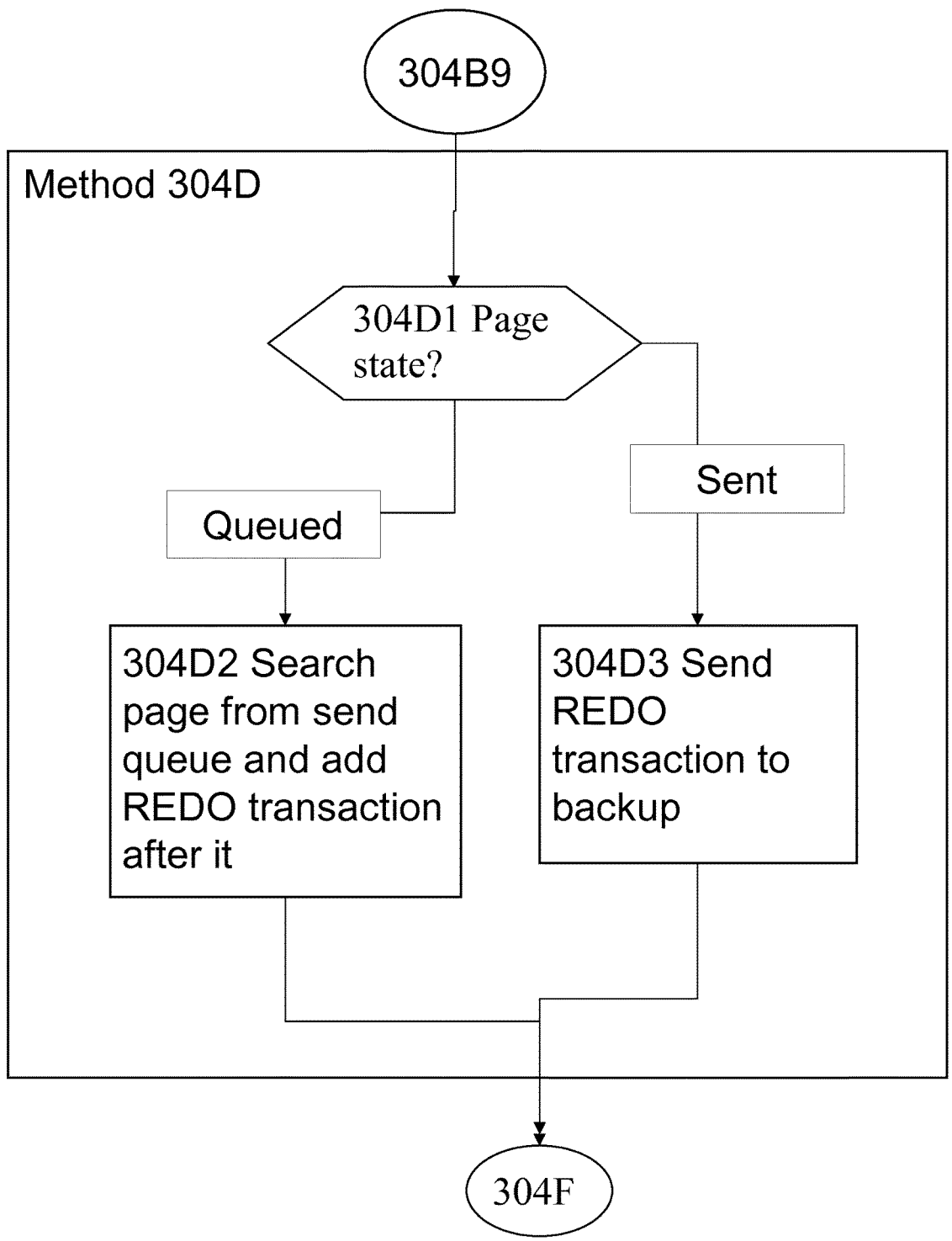

Referring to FIG. 4D, method 304D comprises logical process steps 304D1 to 304D3.

Step 304D1 is for branching to step 304D2 if the page state is "queued". Else if the page state is "sent" then the branch is to step 304D3.

Step 304D2 is for searching for the location of the page in send queue 206 and inserting the REDO transaction into send queue 206 after the location of the page. Then proceeding to step 304F.

Step 304D3 is for sending the REDO transaction to the backup node as soon as possible generally without adding it to the queue. Then proceeding to step 304F.

Figure 5:
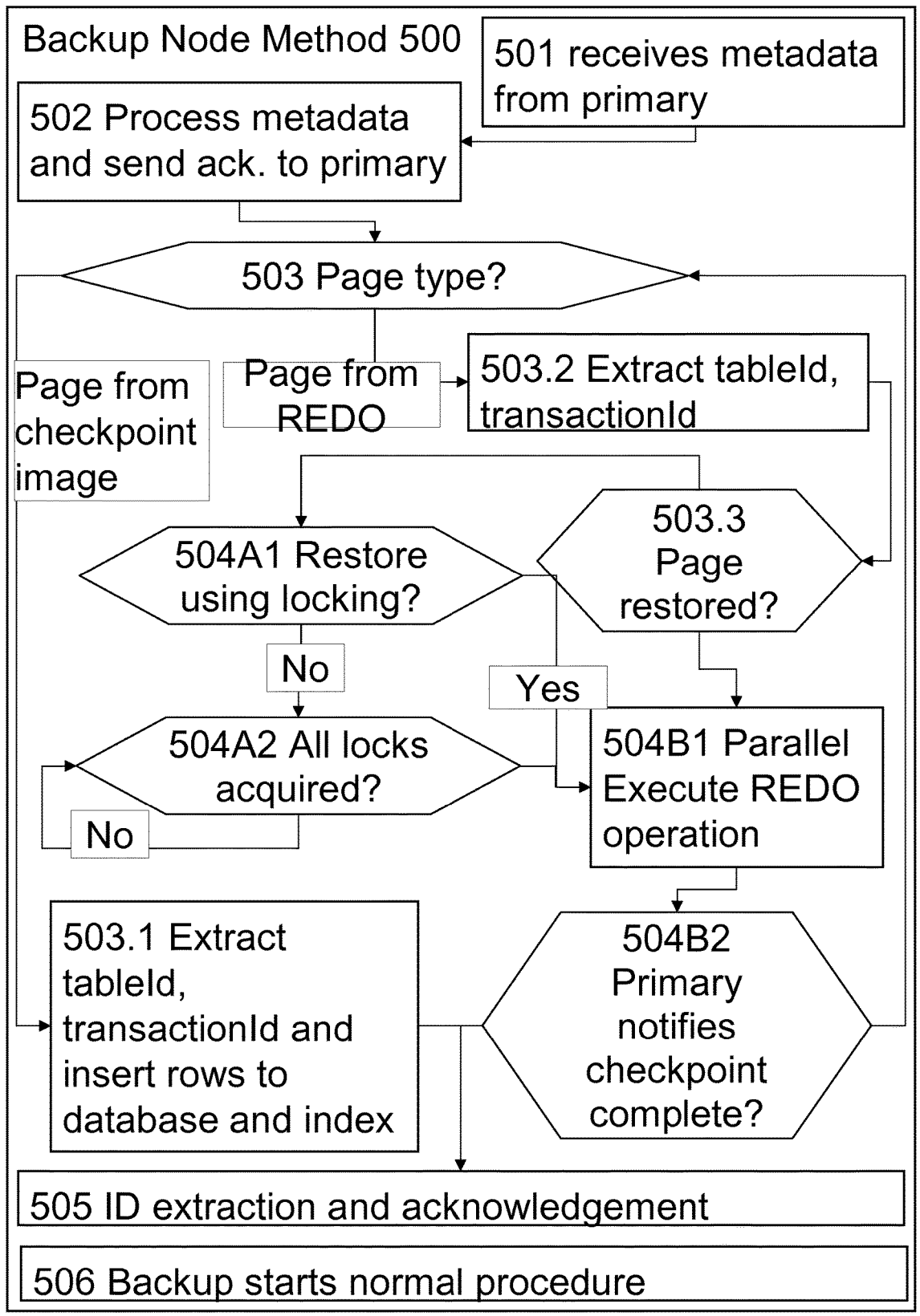
FIG. 5 is a flow diagram of a corresponding backup node process of the depicted embodiment.

Referring to FIG. 5, backup node method 500 comprises logical process steps 501 to 506 (including sub-steps 503.1, 503.2, 503.3, 504A1, 504A2, 504B1, and 504B2). Backup node method 500 is complementary to primary method 300.

Step 501 is for receiving metadata from the primary node. Metadata includes database structure and necessary information for creating database schema, for example, and makes it possible for the backup node to open the database.

Step 502 is for processing the metadata and sending an acknowledgement back to the primary node that it is ready for receiving primary node checkpoint image and REDO transactions corresponding to transactions executed in primary node.

Step 503 is for branching to step 503.1 if the page type is from the checkpoint image. Else, if the document type is a REDO transaction type then the step proceeds to step 503.2. When backup node receives a page it restores it by extracting rows, and necessary information, table id, and transaction id, for example, and by inserting rows to its local database. The backup node keeps track of every page it has restored by inserting them to index.

Step 503.1 is for extracting table ID, transaction ID and for inserting rows and indexes to build the backup database. Then step 505.

Step 503.2 is for extracting tableID and transactionID then step 503.3.

Step 503.3 is for branching to 504B1 if the page is restored and for branching to step 504A1 if the page is not restored.

Step 503A1 is for branching to step 503A2 if the page can be restored using locking and to step 504B1 if not.

Step 503A2 is for acquiring all the locks and branching to step 504B1 when they are all acquired. If the page is not restored then execution can proceed only so far as necessary locks are acquired. Execution waits until corresponding page is restored. If the restore implementation uses locking, then the REDO transaction operation must wait without locks until restore for the page is complete. Else if the page is restored, then the REDO transaction can be executed as normal. If it is possible to execute REDO transactions in parallel in normal HSB operation then it is also possible during synchronization.

Step 504B1 is for parallel execution of the REDO transactions. When the backup node receives a REDO transaction then it extracts necessary information from it (table id and transaction id for example) and checks if the corresponding page has been restored.

Step 504B2 is for branching to step 503 if the primary node notifies the backup node that the checkpoints are complete. Else if there is no notification then step 505.

Step 505 is for extracting the page id and acknowledging. When the backup node receives notification that checkpoint is completely sent by primary then backup node extracts page id from the notification. When that page is completely restored, it acknowledges the primary node that checkpoint image is received.

Step 506 is for reverting to normal procedure by switching from local to distributed commit protocol.

Further embodiments of the invention are now described.

It will be clear to one of ordinary skill in the art that all or part of the logical process steps of the depicted embodiment may be alternatively embodied in a logic apparatus, or a plurality of logic apparati, comprising logic elements arranged to perform the logical process steps of the method and that such logic elements may comprise hardware components, firmware components or a combination thereof.

It will be equally clear to one of skill in the art that all or part of the logic components of the depicted embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the depicted embodiment may alternatively be embodied fully or partially in a parallel computing system comprising two or more processors for executing parallel software.

Figure 6:
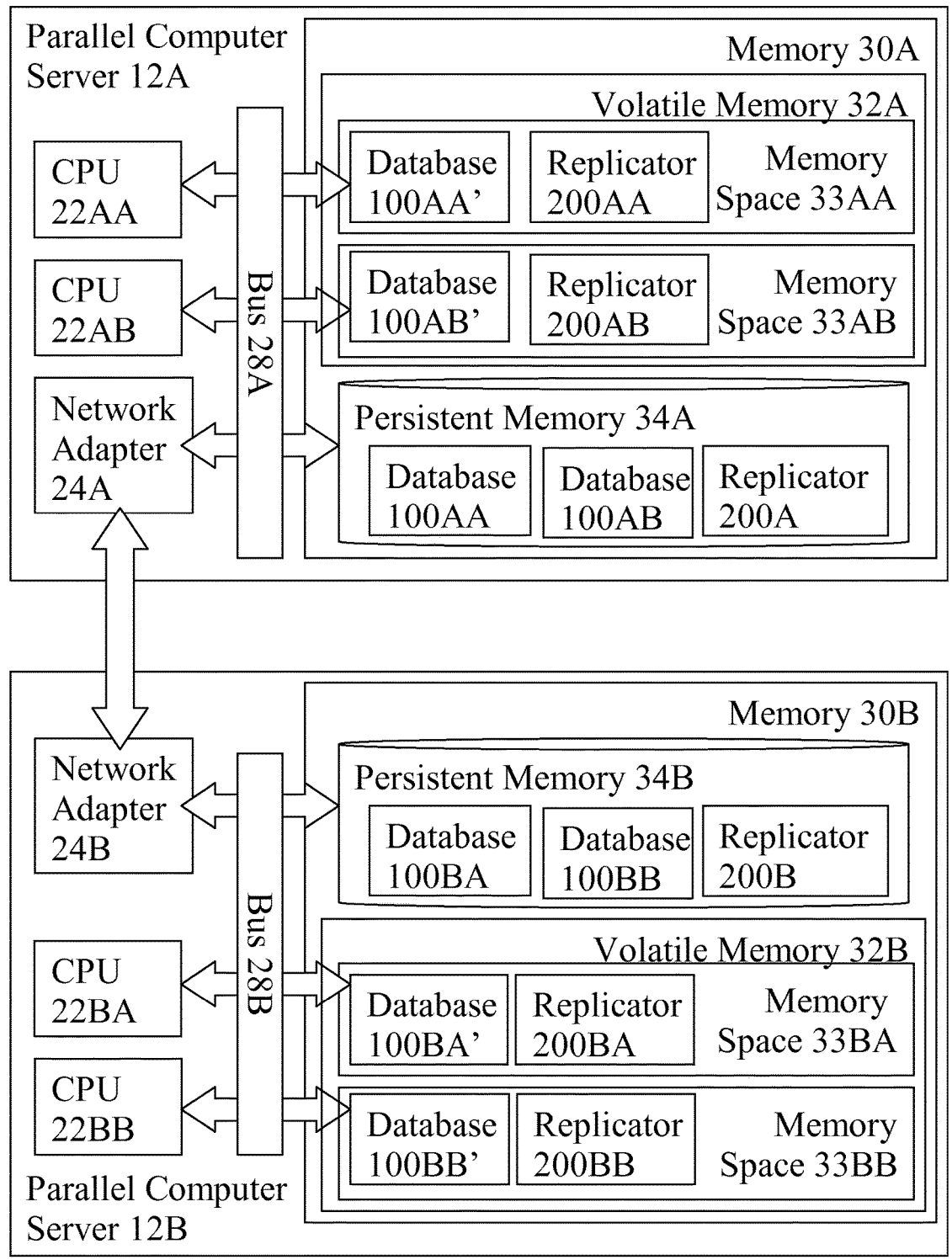
FIG. 6 is a deployment diagram of a parallel computing embodiment.

Referring to FIG. 6, an example parallel computing embodiment 10P is described comprising parallel sets of hot-standby database systems for parallel processing of databases. The depicted embodiment is deployment in a single processor server in a distributed database environment but another embodiment could be implemented in a parallel processor server in a distributed database environment. Parallel hot-standby database system 10P is described in the general context of parallel computer system executable instructions, such as parallel program modules, being executed by parallel computing system 10P. Generally, parallel program modules may include routines, programs, objects, components, logic, data structures, that perform particular tasks or implement particular abstract data types. Parallel hot-standby database system 10P comprises: parallel computer servers 12A and 12B. A direct connection or network provides access between parallel computer servers 12A and 12B.

Parallel computer server 12A comprises: CPU 22AA, CPU 22AB; network adapter 24A; bus 28A and memory 30A. Similarly, parallel computer server 12B comprises: CPU 22BA, CPU 22BB; network adapter 24B; bus 28B and memory 30B.

Buses 28A and 28B represent one or more of any of several types of bus structures, including a memory bus or memory controller, a peripheral bus, an accelerated graphics port, and a processor or local bus using any of a variety of bus architectures.

Memory 30A and 30B include computer system readable media in the form of volatile memory 32A and 32B (such as random access memory and cache memory (not shown)) and in the form of non-volatile or persistent memory 34A and 34B.

Persistent memory 34A comprises: at least two databases 100AA and 100AB; and replicator module 200A. During execution, replicator objects 200AA and 200AB; and corresponding databases 100AA' and 100AB' are instantiated within respective memory spaces 33AA and 33AB within volatile memory 32A.

Similarly persistent memory 34B comprises: at least two databases 100BA and 100BB; and replicator module 200B. During execution, replicator objects 200BA and 200BB; and corresponding databases 100BA' and 100BB' are instantiated within respective memory spaces 33BA and 33BB within volatile memory 32B.

Persistent memory 34A and 34B also store: corresponding operating systems, one or more application programs, a database management system and other program modules. Each of the operating system, one or more application programs, other program modules, and program data or some combination thereof, may include an implementation of a networking environment. Replicator modules 200A and 200B are provided to carry out the functions and/or methodologies of the embodiments in a parallel environment.

Database and replicator modules are autonomous parts of the parallel embodiment. In operation, these two types of modules are extracted from persistent memory 34A and 34B and loaded into volatile memory 32A and 34B so that they may be executed separately and therefore in parallel by respective CPUs (CPU 22AA, 22AB, 22BA, 22BB).

In this example, two CPUs per server are shown but any number of CPUs can be used to build alternative parallel embodiments. In this example, two separate CPUs are used but a single processing unit having multiple cores could be used to build an alternative embodiment.

In this parallel embodiment, the CPUs are physical CPUs but in alternative embodiment virtual CPUs can be simulated. In a virtual parallel computing embodiment, a computer server comprises a virtual computing environment and virtual parallel processing units could be used to build a virtual parallel computing embodiment. A computer server comprises a virtual computing environment having a virtual processing unit with multiple virtual cores.

Further embodiments can comprise any combination of: real processing units; real processing unit cores; virtual processing units; and virtual parallel processing cores.

It will be clear to one skilled in the art that many improvements and modifications can be made to the foregoing exemplary embodiment without departing from the scope of the present invention.

The invention claimed is:

1. A computer system for replicating a database image from an operational primary node in a distributed database environment, said computer system comprising:
   one or more computer processors; and
   one or more computer-readable storage media;
   wherein program instructions are stored on the computer-readable storage media for execution by at least one of the one or more computer processors, the program instructions comprising instructions to cause the at least one of the one or more computer processors to:
   define a checkpoint image of the primary node including a database structure and a plurality of database pages;
   create a replica database on a backup node by initiating a backup node and saving the defined database structure on the initiated backup node;
   send each database page of the checkpoint image to the backup node for saving;
   save, after creation of a checkpoint image is started, each subsequent transaction on the primary node thereby creating a corresponding REDO transaction for sending to the backup node;
   identify each data page operated on by each subsequent transaction;
   send, in parallel with the sending of the database pages, each created REDO transaction to the backup node in the order in which the corresponding transaction occurred so that the backup node can replicate the transactions in the correct order; and
   prioritize each identified database page so that it arrives at the backup node before or substantially at the same time as a corresponding REDO transaction whereby the corresponding REDO transaction can operate on the identified database page without waiting for every database page to be saved on the backup node.

2. The computer system according to claim 1, whereby a modified database page is prioritized over an unmodified database page.

3. The computer system according to claim 1, wherein a database page in main memory is prioritized over database pages in persistent storage.

4. The computer system according to claim 1, further comprising program instructions to:
   identify two or more data pages operated on by a REDO transaction; and sending said two or more data pages in parallel with the sending of the created REDO transaction.

5. The computer system according to claim 1, wherein the primary node notifies the backup node that all database pages have been sent.

6. The computer system according to claim 1, wherein the backup node notifies the primary node that all database pages have been received.

7. The computer system according to claim 1, wherein REDO transactions and database pages are interleaved in a send buffer before sending to a backup node.

8. The computer system according to claim 1 wherein transactions place a continuous load on the primary node.

9. A method for replicating a database image of an operational primary node to a backup node in a distributed database environment, said method comprising:
   defining a checkpoint image of a primary node including a database structure and a plurality of database pages;
   creating a replica database on a backup node by initiating a backup node and saving the defined database structure on the initiated backup node;
   sending each database page of the checkpoint image to the backup node for saving;
   saving, after creation of a checkpoint image is started, each subsequent transaction on the primary node thereby creating a corresponding REDO transaction for sending to the backup node;
   identifying each data page operated on by each subsequent transaction;
   sending, in parallel with the sending of the database pages, each created REDO transaction to the backup node in the order in which the corresponding transaction occurred so that the backup node can replicate the transactions in the correct order; and prioritizing each identified database page so that it arrives at the backup node before or substantially at the same time as a corresponding REDO transaction whereby the corresponding REDO transaction can operate on the identified database page without waiting for every database page to be saved on the backup node.

10. The method according to claim 9, whereby a modified database page is prioritized over an unmodified database page.

11. The method according to claim 9, wherein a database page in main memory is prioritized over database pages in persistent storage.

12. The method according to claim 9, further comprising: identifying two or more data pages operated on by a REDO transaction; and sending said two or more data pages in parallel with the sending of the created REDO transaction.

13. The method according to claim 9, wherein the primary node notifies the backup node that all database pages have been sent.

14. The method according to claim 9, wherein the backup node notifies the primary node that all database pages have been received.

15. The method according to claim 9, wherein REDO transactions and database pages are interleaved in a send buffer before sending to a backup node.

16. The method according to claim 9 wherein transactions place a continuous load on the primary node.

17. A computer program product for replicating a database image from an operational primary node to a backup node in a distributed database environment, the computer program product comprising a non-transitory computer-readable storage medium having computer-readable program code embodied therewith, the computer-readable program code configured to:

define a checkpoint image of a primary node including a database structure and a plurality of database pages;

create a replica database on a backup node by initiating a backup node and saving the defined database structure on the initiated backup node;

send each database page of the checkpoint image to the backup node for saving;

save, after creation of a checkpoint image is started, each subsequent transaction on the primary node thereby creating a corresponding REDO transaction for sending to the backup node;

identify each data page operated on by each subsequent transaction;

send, in parallel with the sending of the database pages, each created REDO transaction to the backup node in the order in which the corresponding transaction occurred so that the backup node can replicate the transactions in the correct order; and prioritize each identified database page so that it arrives at the backup node before or substantially at the same time as a corresponding REDO transaction whereby the corresponding REDO transaction can operate on the identified database page without waiting for every database page to be saved on the backup node.

18. The computer program product of claim 17, wherein a modified database page is prioritized over an unmodified database page.

19. The computer program product of claim 17, wherein a database page in main memory is prioritized over database pages in persistent storage.

20. The computer program product of claim 17, further comprising program instructions to:

identify two or more data pages operated on by a REDO transaction; and sending said two or more data pages in parallel with the sending of the created REDO transaction.

\* \* \* \* \*